March 8, 1966 W. B. ELLIOTT 3,239,266
SAFETY REMOTE CONTROL LOAD HOOK
Filed Jan. 17, 1964 2 Sheets-Sheet 1
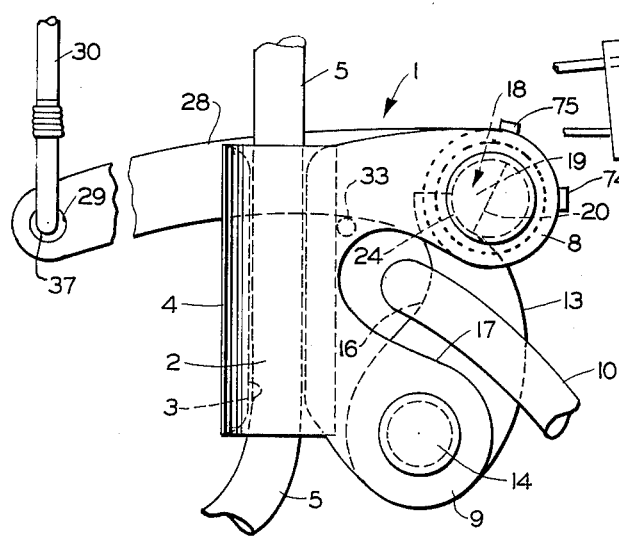
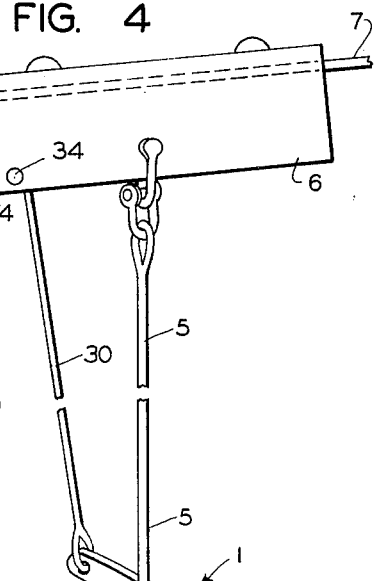
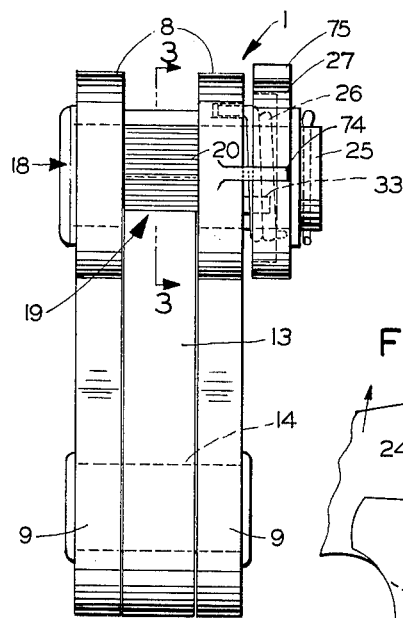
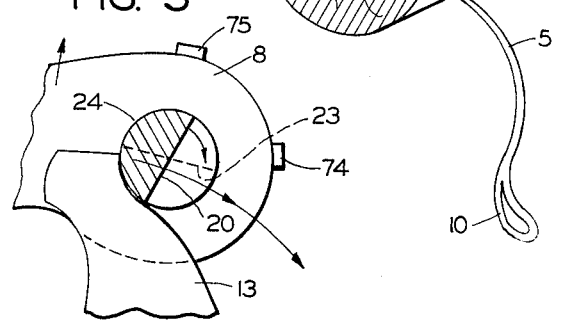
INVENTOR.
WELCH B. ELLIOTT
BY
Boyken, Mohler & Foster
ATTORNEYS March 8, 1966 W. B. ELLIOTT 3,239,266
SAFETY REMOTE CONTROL LOAD HOOK
Filed Jan. 17, 1964 2 Sheets-Sheet 2
FIG. 5
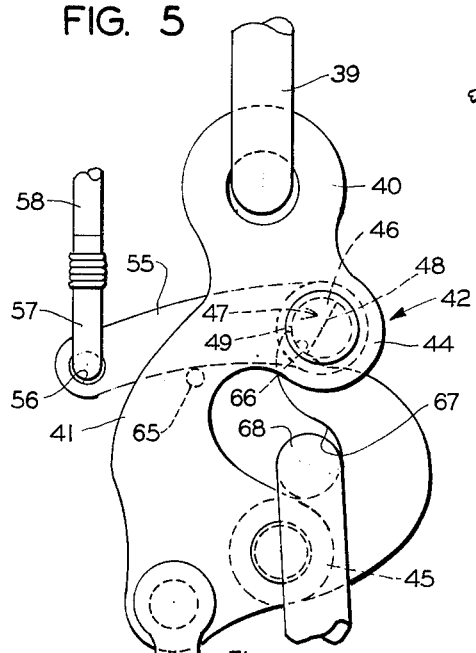
FIG. 6
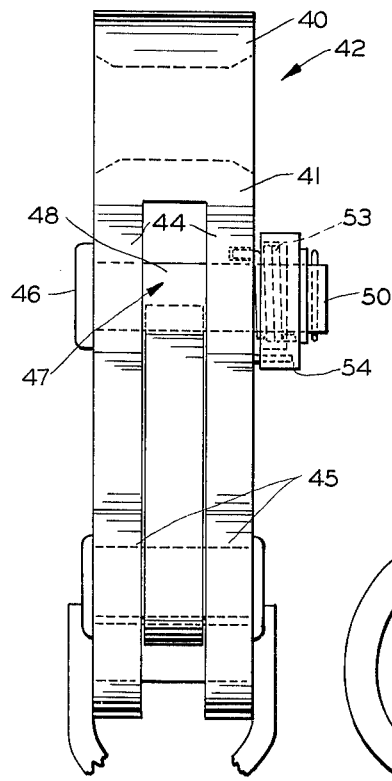
FIG. 7
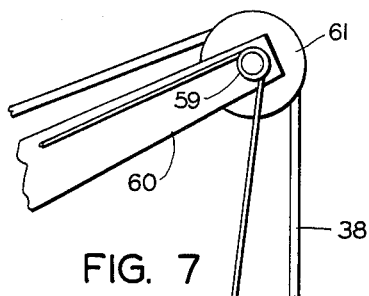
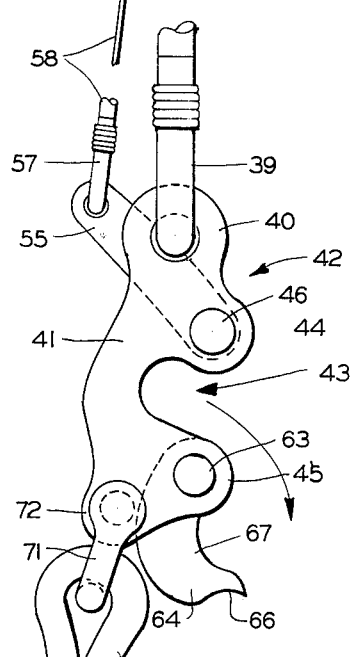
INVENTOR.
WELCH B. ELLIOTT
BY
Boyken, Mohler & Foster
ATTORNEYS

United States Patent Office 3,239,266
Patented Mar. 8, 1966

3,239,266
SAFETY REMOTE CONTROL LOAD HOOK
Welch B. Elliott, San Francisco, Calif., assignor to E. D. Bullard Company, Sausalito, Calif., a corporation of California
Filed Jan. 17, 1964, Ser. No. 338,463
5 Claims. (Cl. 294—83)

This invention relates to a safety remote control hook. Hooks of this general type have, in the past, been known as "mousing hooks," in that a movable mousing closes the gap or space through which the ring, eye, hook, loop or other similar element on a load, rope or the like is inserted into the hook. When the mousing is released at one of its ends, the element that is in the hook is released to automatically fall out of the hook to release the load. Such element may be called the "load carrying element" or member, and the mousing may be called a "mousing link," since it is a link and is pivotally connected at one end to what may be termed the bill of the hook, and prevents escape of the load carrying element from the hook, but when the mousing link is released at the end that is opposite to its pivoted end, the weight of the load suspended from the load carrying element will automatically and instantly swing the mousing link to release the load carrying element, and consequently, the load.

One of the objects of the present invention is the provision of a releasable mousing link on a load hook or choker hook that is adapted to be tripped or actuated by remote control so that the load may be released and fall without danger to workmen or others.

Another object of the invention is the provision of a simple, rugged, and reliable releasable locking means on a remote control hook, whereby accidental release of the mousing link is reduced to the minimum.

A still further object of the invention is the provision of a mousing hook of the choker type, in which the mousing link structure and its action are the same as in a load hook that incorporates the releasable mousing link.

An added object of the invention is the provision in a load carrying hook of means for retaining one end of a load carrying sling on the hook after the mousing hook has been released to release the load.

Other objects and advantages will appear in the description and drawings.

In the drawings:

FIG. 1 is a side elevational view of a choker hook that incorporates the releasable mousing link. A portion of the wire rope in simplified form is shown and the mousing link is indicated in closed position.

FIG. 2 is an enlarged, edge view of the hook of FIG. 1 as seen from the mousing side. The wire rope and jerkline or the remote control line being omitted.

FIG. 3 is a fragmentary, enlarged, cross sectional view taken along line 3—3 of FIG. 2.

FIG. 4 is a reduced view showing one example of the choker hook in operation in a position in which the mousing link has been released, the part in cross section being a portion of a log that has been released.

FIG. 5 is a side elevational view of a load hook that incorporates approximately the same mousing link structure as FIG. 1, but which hook includes means for retaining a sling or the like connected with the hook after the load carried by the sling has been released, and which load hook also has the wire rope from which it is suspended fixedly connected thereto rather than using the sliding choker portion of FIG. 1. Portions of the wire ropes from which the hook itself is suspended, and the sling, are indicated.

FIG. 6 is an enlarged, lateral end elevational view of the hook of FIG. 5, but with the wire ropes omitted.

FIG. 7 is a reduced size edge elevational view of the hook of FIG. 4 as seen from the mousing side, showing one example of the hook in use, with the mousing link released, but with the sling still connected to the hook. A portion of the boom of a crane is shown in greately reduced size to indicate the connections between the hoisting cable and jerk line with respect to the hook.

The hook of FIGS. 1–3 is known as a choker hook, and is generally designated 1. This hook comprises a main, vertically disposed, flat-sided body 2 formed with a vertically elongated open-ended passageway 3 along one vertically extending edge 4 thereof, through which passageway the hoist cable or wire rope 5 is adapted to freely extend upwardly to a conventional trolley 6 (FIG. 4) that, in turn, may be supported on a generally horizontally extending cable 7 for movement of the trolley longitudinally along the cable.

The present invention is not to be restricted to this particular use, since the wire rope 5 may be connected with any hoisting means. However, FIG. 4 illustrates one of the commonly used trolleys for handling logs. In FIG. 4 the cable 5 may extend from the trolley to a conventional stationarily supported power-driven winding drum (not shown), while in other places a conventional crane of the Gantry, or other type, may be used.

The body 2 in FIG. 1 has an upper pair of horizontally spaced ears 8 projecting laterally to one side thereof; and a lower pair of horizontally spaced ears 9 project to the same side and are spaced below ears 8. The pair of upper ears 8 are in vertical alignment with the lower ears 9, thus the upper and lower pairs of ears will respectively define the upper and lower sides of a laterally outwardly opening recess, in which recess the one side of a loop 10, that is at the lower end of wire rope 5, is adapted to be received through the open side of said recess. This loop is at the end of the wire rope that is below passageway 3, and will not pass through the latter, hence the hook 1 will be suspended from the wire rope.

The open side of the recess formed in body 2, as above described, is adapted to be closed by a mousing link, generally designated 13. A horizontal pivot 14 extending through and between the lower ears 9 pivotally supports one end of link 13 between said ears for swinging upwardly from an open position depending from ears 9 (FIG. 3) to a closed position extending upwardly from ears 9 across the open side of the laterally opening recess formed in the body by the upper and lower pairs of ears 8, 9.

The recess formed in body 2 may be generally designated 15 (FIG. 4) and the edge 16 (FIG. 1) of the mousing link 13 that faces into said recess when the link is in its closed position is concavely curved to generally follow the convex cross sectional contour of the side of loop 10 that is in said recess.

The upper edges 17 of the ears 9 slant downwardly in a direction toward the outer ends of the ears, hence the loop 10, which loop will be termed a load supporting element, will automatically be released to fall out of said recess 15 upon the link 13 being freed to swing outwardly from its closed position under the influence of the weight of a load carried by the portion of wire rope 5 that extends between the lower end of passageway 3 and the loop 10.

A horizontal shaft 18 has cylindrical end portions rotatably supported in coaxial openings formed in ears 8 and the portion of said shaft that extends between said openings is cut away to provide a semi-cylindrical portion 19 that is eccentrically disposed relative to the axis of said shaft, with a flat surface 20 that is approximately even with said axis and that is opposite to the cylindrical outer surface of portion 19. In effect, this structure forms a recess in one side of shaft 18, which is of a depth sufficient to permit the outer end of the mousing link 13 to freely pass through said recess and past said shaft when the link is swung to closed position. The dot-dash line 23 in FIG. 3 indicates the position of the flat surface that forms one side of portion 19 when the shaft has been rotated clockwise as seen in FIG. 1, to release the link 13.

The cylindrical outer surface 24 of portion 19 will face and engage the lateral side of the outer end of link 13 (FIG. 1) to obstruct swinging of the link 13 out of closed position.

Preferably the edge of the link 13 that is adapted to engage the cylindrical surface of the portion 19 is concavely curved (FIG. 1) to conform to the convex cylindrical surface of said portion.

One end portion 25 of shaft 18 (FIG. 2) projects outwardly of the ears 8 and a torsion spring 26 encircles said end portion in a position between one of said ears 8 and one end 27 (FIG. 2) of an arm 28 (FIG. 1) that is secured to said end portion 25. One end of said spring is secured to said one ear 8 and the outer end is secured to said end portion 27, the spring being biased to yieldably urge shaft 18 to a position in which the portion 19 thereof will block or obstruct movement of the outer end of link 13 therepast.

The arm 28 projects rearwardly relative to the body 2, considering the recess 15 as being on the forward side of the body, and it projects past the portion of the body having passageway 3 formed therein and past cable 5. The rear end of this arm, or the end opposite to end portion 27, is formed with an opening 29 adapted to receive the eye 37 at one end of the rope 30.

A projection 33 (FIG. 1) on body 2 projects below arm 28 and prevents the spring 26 from biasing the arm past said projection in a downward direction. The side of end portion 27 of arm 28 is indicated as being recessed to receive spring 26 (FIG. 2).

The rope 30 may extend into one end of the trolley 6 and over a roller on shaft 34 and downwardly to the outer end of the arm 28. The outer end of the rope, or the end that is opposite to arm 28, may extend to any point remote from the hook where it may be anchored, or where an operator may jerk it to pull arm 28 upward so as to release the mousing link. When the line is anchored, the release of the mousing link would usually be automatic due to movement of the trolley away from the point where the rope is anchored, and as soon as the trolley reaches the limit of the length of the rope the arm 28 is automatically jerked upwardly to release the mousing link.

In operation, the hook 1 is lowered until the portion of the wire rope 5 drawn through passageway 3 is sufficient to encircle a log, such as indicated at 36 (FIG. 3) and to insert loop 10 into recess 15, the mousing link being released and in open position. The link may then be swung sharply to closed position, and when the outer end strikes the lower half of the flat surface 20 it will automatically rotate shaft 18 against the resistance of spring 26 to permit the outer end of the link 13 to pass the portion 19 of said shaft 18. The portion 19 will snap back to a position in which its convex surface is next to the outer end of link 13 and the link will be positively locked in closed position until the outer end of arm 28 is drawn upwardly against the resistance of spring 26.

The log is then carried by trolley 6 or by any other form of hoisting device to the desired position, when a jerk on line 30 will move arm 28 upwardly to rotate the shaft 18 so that the flat side 20 of the latter faces downwardly, and when in this position, the link 13 will swing outwardly and downwardly to open position (FIG. 3) and the log 36 will drop.

The log 36, or the like, will, of course, be tightly held by the wire rope 5 inasmuch as the portion of said rope that encircles the log will be automatically drawn tighter about the log as the latter is lifted. When the log is released the loop 10 will preclude the wire rope 5 from being separated from the choker hook.

FIGS. 4–6 show a hook of the type in which the hoisting cable or wire rope 38 has a loop 39 or the like held in an eye 40 that is rigid with the upper end of the main body 41 of a mousing hook generally designated 42.

The body 41 is formed with a laterally opening recess 43 (FIG. 7), the upper side of which recess is defined by a pair of horizointally spaced ears 44 projecting laterally from the body 41, and the lower side of which recess is defined by a pair of horizontally spaced ears 45, also projecting laterally from the main body 41.

A horizontal shaft 46 that corresponds to shaft 18, both in structure and function, is rotatably supported in ears 44, and the central portion 47 that spans the space between said ears is semicylindrical and eccentrically positioned relative to the central axis of said shaft. The central portion has a flat surface 48 (FIG. 5) facing the axis of the shaft, and the opposite surface 49 is cylindrical, which surfaces 48, 49 correspond to surfaces 20, 24 of FIG. 3.

One end portion 50 (FIG. 6) of shaft 46 projects outwardly of one of the ears 44 and a torsion spring 53 is around said projecting portion 50, one end of which is secured to the ear 41 that is adjacent thereto, while the opposite end is secured to one end 54 (FIG. 6) of one arm 55 (FIG. 5) that is secured on the projecting end 50 of shaft 46.

Arm 55, like arm 28 of FIG. 1, projects past the wire rope 39 in a direction away from the open side of recess 43, and the outer end of said arm is formed with an opening 56 in which is secured a loop 57 that is on one end of the jerk line 58.

Jerk line 58 may extend vertically upwardly from arm 55 and over a roller 59 of the outer end of the conventional boom 60 of a hoist, and wire rope 38, from which the hook 42 is suspended, may also extend upwardly and over a grooved wheel 61 on the outer end of said boom. The ends of the lines 58, 38 may extend to the carriage (not shown) of the hoisting boom, where wire rope 38 will be secured to a power driven winding drum (not shown). The line 58 usually will be accessible to an operator on the carriage for the boom 60 or at any desired point remote from the location where the load suspended from the hook 42 is to be deposited.

A pivot 63 carried by, and extending between, the lower ears 45 pivotally supports one end of the mousing link 64, and the outer end of said link is adapted to swing upwardly from an open position (FIG. 1) depending from body 41 to a closed position extending across the open side of recess 43 and past portion 48 of shaft 46 when the shaft is rotated so that the flat surface 48 of said shaft is facing downwardly.

The spring 53 is biased to yieldably urge the shaft to a position in which the portion 47 obstructs the outward movement of the upper end of the mousing link when the latter is in said closed position. When said link is in said closed position the arm 55 is also yieldably urged downwardly against a stationary stop element 65 (FIG. 5).

The surface 66 of the outer end of the mousing link 64 that is adapted to engage the cylindrical outer surface 49 of portion 47 is preferably concave to follow the convex contour of said cylindrical portion, while the surface 67 of the link that faces into recess 43 when the link 64 is in closed position may be of concave contour against which the portion of an eye 68 at one end of a sling 69 (FIG. 7) is adapted to engage when the said portion of the eye or loop 68 is in said recess, and when the link 64 is in closed position (FIG. 5).

The end of the sling 69 that is opposite to eye 68 may also be formed to provide a similar eye 70. Eye 70 is adapted to be secured to a shackle 71 that, in turn, is swingably held in coaxial openings formed in downward and rearward extensions 72 of ears 45.

If the hook 42 is to be used to directly engage a load lifting member on a load, instead of the sling 69 being employed, the sling and shackles 71 may be omitted. In fact the hook can be one in which the projection 72 is omitted.

Where the sling is used to extend around the load or through a lifting eye on the load, the eye 68 on the sling is positioned in the hook and the mousing link is moved to closed position. After the load has been deposited, the jerk line 58 is jerked to swing arm 55 to the position shown in FIG. 7, and the mousing link 64 will swing away to permit the eye 68 to drop out of the hook, which will automatically occur. Then upon lifting the body 41 by hoist line 38 the sling will be pulled away from the load and will remain attached at one end to the body 41 for being carried back to a loading position for being connected to a new load.

In the hook 1 (FIGS. 1–4) projection 74 may be provided upon the foreward end of the ear 8 adjacent portion 27 or arm 28, engageable with projection 75 on portion 27 and spaced approximately 90° therefrom for limiting upward rotation of arm 28 to approximately one-quarter rotation when arm 28 is urged upwardly by a jerk on rope 30. Shaft portion 19 rotating with arm 28 is thereby permitted sufficient rotation to move from a position retaining link 13 to a position releasing link 13 but is prevented from further rotation by projections 74, 75. It will be noted that in the hook 42, eye 39 of rope 38 similarly functions as a stop for limiting rotation of arm 55 when the latter is rotated to release link 64. The fact that the hooks of the present invention are flattened bodies lends itself to laminated structure, in which stamped metal pieces may be used, although the hooks may also be cast or combinations of castings and stamping. In any event, the structure is simple and provides for the safety of the operator.

The appended claims are intended to cover modifications that come within the scope thereof and with the spirit of the invention. For example, the hook may be modified to constitute a safety hook, omitting the remote control feature by merely eliminating the extended elongated portion of the arms 28, 55 and manually grasping the side-recessed remaining end portion 27 of FIG. 1 or the corresponding end portion 54 (FIG. 6) on the end of arm 55 of FIGS. 5–7. It has already been noted that the projection 72 of the body 41 (FIG. 7) could be eliminated where no sling or similar device is used in the manner illustrated in FIGS. 5–7.

I claim:

1. In a safety hook of the type having a main body portion comprising parallel spaced apart C-shaped side wall members forming spaced top and bottom ears and defining an open recess between said walls adapted to receive a load supporting element thereinto and a mousing link carried by the bottom ears between said walls and pivotally supported thereby whereby the link is movable from an open depending position to a closed upstanding position between said walls of the top ears to close off access to or from said recess and means to lock said link in closed position, the improvement comprising:
   a rotatable shaft bridging said walls adjacent and journaled in opposite top ears;
   a cutaway portion in said shaft between said walls to for a cam surface in one segment of said shaft;
   spring means connected to said shaft to bias rotatably said shaft in one direction to position said cam surface in the path of travel of said mousing link when moved from open to closed position and to return said shaft to said last named position when the link is moved past said shaft to closed position; said shaft when in said last named position being in direct engagament with said link to obstruct movement thereof to open position;
   and lever release means connected to said shaft to frictionally rotate said shaft in a direction opposite its said biased direction of rotation in order to release the link from engagement with said shaft.

2. A safety hook according to claim 1 and wherein at least one end of said rotatable shaft projects beyond a wall and said lever release means is connected to said projected shaft end.

3. A safety hook according to claim 2 and wherein stop means is provided to limit rotation of said rotatable shaft in either direction of rotation.

4. A safety hook according to claim 1 and wherein the wall portions defining the recess are inclined upwardly and rearwardly and said link is formed with a concave load element engaging portion so that when the link is released from its locked position the load supporting element is freed of engagement from said hook components for gravity induced release therefrom.

5. A safety hook of the type having a main body portion comprising a C-shaped member provided with a mousing link pivotally connected to one leg of said C-shaped member and movable from a first position in locked engagement with respect to said second leg of said C-shaped member to an open position in an unlocked relationship with said second leg, and a load supporting element carried by said C-shaped member and having an end engageable in locked position within said C-shaped member when said mousing link is in the first position and freed therefrom when in the second position, the improvement comprising:
   said second leg being formed of two spaced apart parallel ears;
   a rotatable shaft bridging said ears and journaled therein;
   a cutaway portion in said shaft between said ears;
      said mousing link pivotally mounted to move between said ears and having a length to clear the cutaway portion of said shaft when said shaft is in a first position and to abut directly against said shaft in the second position;
   means urging said shaft to said second position;
   and lever arm means connected to said shaft to facilitate rotatable movement of said shaft to move said shaft between said first and second positions.

References Cited by the Examiner

UNITED STATES PATENTS

| 2,559,999 | 7/1951 | Regan | 294—83 X |
| 3,132,888 | 5/1964 | Haller | 294—83 |
| 3,154,337 | 10/1964 | Walker | 294—83 X |

GERALD M. FORLENZA, *Primary Examiner.*

SAMUEL F. COLEMAN, *Examiner.*